Sept. 20, 1938. F. T. KREIN ET AL 2,130,588
CONTAINER FOR PACKAGING FROZEN CONFECTIONS FOR DISTRIBUTION AND SERVING
Original Filed Oct. 31, 1935 2 Sheets-Sheet 1
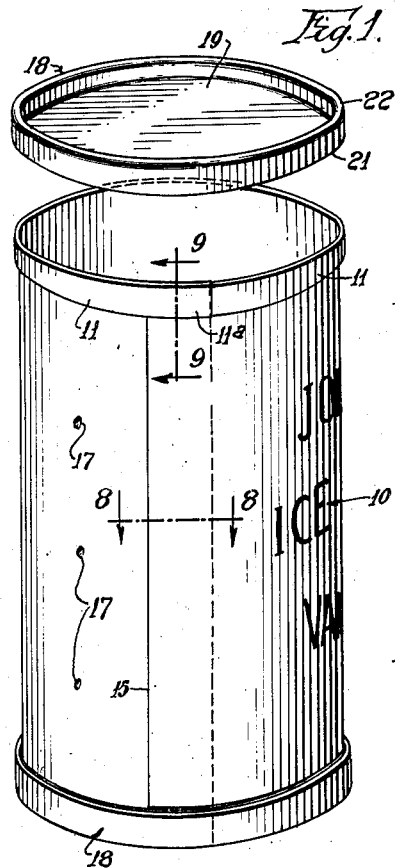
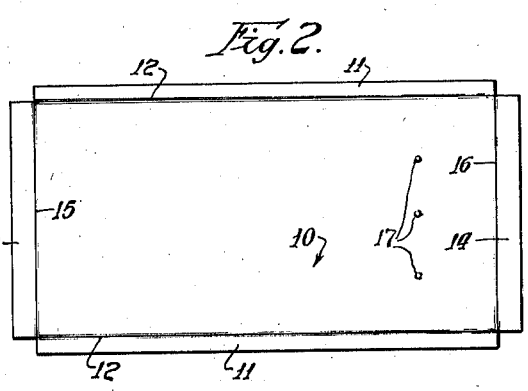
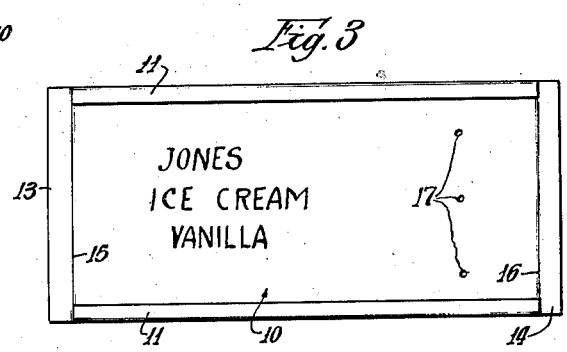
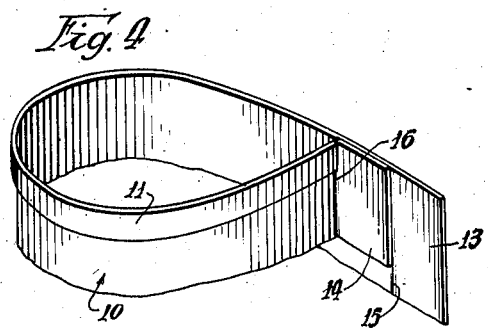
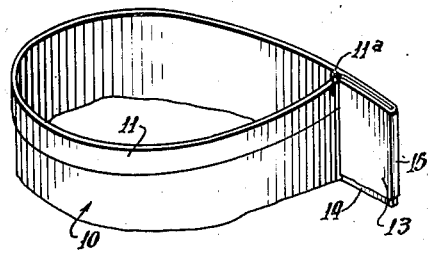

Sept. 20, 1938.  F. T. KREIN ET AL  2,130,588
CONTAINER FOR PACKAGING FROZEN CONFECTIONS FOR DISTRIBUTION AND SERVING
Original Filed Oct. 31, 1935  2 Sheets-Sheet 2
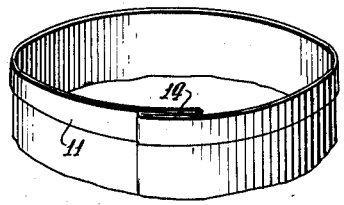
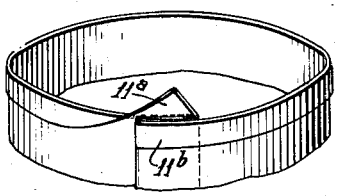
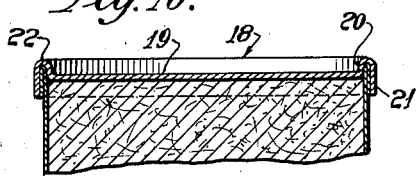
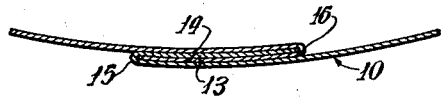
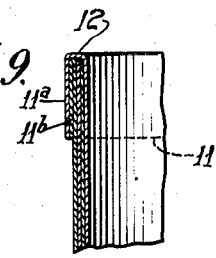
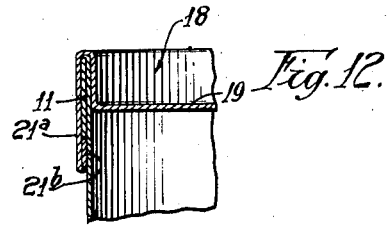
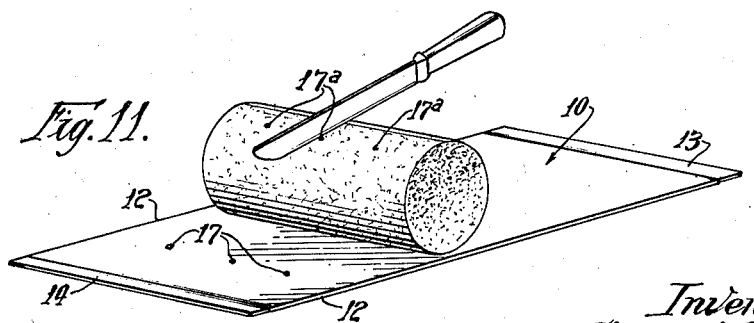

Patented Sept. 20, 1938

2,130,588

UNITED STATES PATENT OFFICE 2,130,588

CONTAINER FOR PACKAGING FROZEN CONFECTIONS FOR DISTRIBUTION AND SERVING

Frederick T. Krein and Torris H. Alfreds, Park Ridge, Ill., assignors, by direct and mesne assignments, to Dixie-Vortex Company, Chicago, Ill., a corporation of Delaware Original application October 31, 1935, Serial No. 47,530. Divided and this application January 24, 1936, Serial No. 60,602

10 Claims. (Cl. 229—4.5)

This invention relates to improvements in containers for packaging frozen confections for distribution and serving and it consists of the matters hereinafter described and more particularly pointed out in the appended claims.

This application is a divisional application, as the subject matter thereof was first presented in our copending application, Serial No. 47,530, filed October 31st, 1935.

Among the methods employed by manufacturers of ice cream and similar frozen confections for the packaging and distribution thereof to the retailer, is the so-called "factory packed" method. In this method, containers usually of "pint" and "quart" sizes, are each filled with a semi-solid mix and then frozen at the factory into a relatively hard condition. The filled containers are distributed in this condition to the retailer for sale to the consumer. This method, as now practiced, has certain objections not only from the viewpoint of the manufacturer but also from the viewpoint of the purchasing consumer. Said method requires the use of relatively costly containers which occupy much storage space, require much extra handling, and as they are made of relatively heavy paper stock, require more time in the freezing to which the filled containers are subjected. This, of course, increases the cost of manufacture a proportionate amount. In the hands of the purchasing consumer, the serving requires the spooning out of the contents from the container into the serving dish or glass employed. As the contents are quite hard due to freezing, this spooning out usually results in some spillage which rapidly melts with attending messy and unsanitary conditions. Also, it is quite difficult in this serving of the contents, to divide the same in equal portions.

One of the objects of the present invention is to provide a novel container for packaging frozen confections and which containers may be stored in a knock-down condition until required for use and may then be readily assembled into container form for filling and freezing and which, when received by the consumer, may be easily opened to expose the contents thereof for a division into equal portions for serving.

A further object of the invention is to provide an improved container for this purpose which consists of a body blank and a pair of preformed end closures, which when assembled together, provide a low cost, strong and rigid container, capable of holding a semi-frozen mix without leaking and which container requires no adhesive in its make-up, and is, therefore, indeed sanitary.

Again, it is an object of the invention to provide a container for this purpose, which may be readily opened, merely by removing the end closures and stripping or unrolling the body from the contents thereof to expose the same as a roll or cylinder for a cutting or separation thereof into the desired number of portions to be served, the contents resting upon the opened flattened out body during this procedure.

Still a further object of the invention is to provide a container for this purpose, which may be made from a thinner and less costly paper and which because of its thinness, permits quicker freezing of the contents which thereafter lends rigidity to the container to provide a firm, neat package, the contents of which are substantially free from ice crystals due to the quick freezing.

The above mentioned objects of the invention, as well as others, together with the several advantages thereof will more fully appear as the specification proceeds.

In the drawings:

Fig. 1 is a perspective view of a container embodying the preferred form of the invention, with one of the closure caps in position thereon to bottom the body and with the other of said caps shown in position spaced above the top end of the body ready for application thereto.

Fig. 2 is a plan view of the blank from which the body of the container shown in Fig. 1 is made.

Fig. 3 is a view similar to Fig. 2 showing the body blank after top and bottom marginal portions of the same have been folded over upon one side of the blank to form the top and bottom flanges for the body.

Fig. 4 is a fragmentary perspective view showing the first step of rolling or forming the body blank into tubular form and which step consists in positioning one end flap of the blank with respect to the other end flap thereof.

Fig. 5 is a fragmentary perspective view showing the next step in rolling or forming the body blank into tubular form and which step consists in folding the flap at said other end of the blank, into a hooked engagement with the first mentioned one.

Fig. 6 is a fragmentary perspective view illustrating a further step in the rolling or forming the body blank into tubular form and wherein the end flaps are interengaged or interhooked with each other to form a separable lock joint seam that lies relatively flat against the body.

Fig. 7 is a view similar to Fig. 6 and illustrates the manner in which one end of the top flange of the body is lifted up to permit the tucking under of the other end of the top flange of the body to provide an end lock for the separable lock joint seam of the body.

Fig. 8 is a horizontal detail sectional view on an enlarged scale, through the separable lock joint seam of the container body as taken on the line 8—8 of Fig. 1.

Fig. 9 is a fragmentary vertical detail sectional view through the top end of the separable lock joint seam of the container body as taken on the line 9—9 of Fig. 1.

Fig. 10 is a vertical sectional view through the top end of the container body and one form of cap or closure therefor.

Fig. 11 is a perspective view of the container body and contents after the body has been stripped from the contents, with the contents in position upon the flattened out body, ready for slicing into portions to be served.

Figure 12 is a fragmentary detail vertical sectional view illustrating a modified form of closure cap which may be used in connection with the container body.

Referring now in detail to that embodiment of the invention illustrated in Figs. 1 to 11 inclusive of the accompanying drawings, the container includes a body made from a blank of the generally rectangular shape shown in Fig. 2. Preferably, said blank is made from relatively thin sheet material capable of being manipulated or rolled, either by machine or hand, into body form, and a wax impregnated paper free from surface wax, is well adapted for the purpose. Such a paper is not only moisture-proof but it is strong and relatively pliable and may be folded along, scored or creased lines without cracking.

The blank shown in Fig. 2, and which is of a rectangular shape, is of a width from side to side, greater than the circumference of the body to be made and is of a height from top to bottom, greater than the height of said body to be made. Said blank includes a body 10 and top and bottom flanges 11—11 joined to the body by longitudinal fold or score lines 12—12. At each end of the blank body is a flap 13 and 14, respectively, joined thereto by transverse fold or score lines 15 and 16, respectively, the last mentioned score lines being disposed in the planes of the ends of the top and bottom flanges 11—11. In the body of the blank are certain spaced indentations 17 arranged from the top to the bottom of the body and the purpose thereof will appear later.

The top and bottom flanges 11—11 are intended for folding over upon the same side of the blank as appears in Fig. 3 and which side forms the outside of the finished body. On this side of the blank, matter relating to the contents of the container may appear as shown in Fig. 3. The score lines 15 and 16 are so disposed that the flap 13 may be folded over toward one side of the blank body and the flap 14 may be folded over toward the other side of the blank body. Blanks in this condition may be readily stacked in neat packages for delivery to and storage by the user, such as an ice cream manufacturer or the like.

The blank when in the condition shown in Fig. 3, is ready for manipulation or rolling, into the tubular body for the container. Such manipulation or rolling may be carried out by a suitable machine but it will be described herein as being carried out by hand.

The blank mentioned is intended for rolling into a tubular container body or circular shape, although other shapes may be provided by scoring the blank along lines extending from top to bottom of the blank, as is apparent. In manipulating or rolling the blank into a circular tubular shape, the end flap 14 is brought around toward the end flap 13 and is engaged with the inner face of the blank so that the free edge of said flap 14 coincides with the score line 15 of the flap extension 13. This position of the parts best appears in Fig. 4.

The flap 13 is then folded along the line 15 to engage the exposed face of the flap 14, as shown in Fig. 5, after which the two flaps are jointly folded about the score line 16 against the body of the blank, as best appears in Fig. 6. When the parts are in this condition, the flaps 13 and 14 have an inter-engaged or hooked-together connection, with one flap engaged in a pocket provided by the other flap and its overlapped body blank portion and vice versa. The connection is such as to provide a relatively tight, lock-joint, but separable seam.

With the parts as shown in Fig. 6, it is apparent, that that end of the body blank associated with the flap 14 has a considerable overlap with respect to that part of the body blank associated with the flap 13 and that the top and bottom ends of the flap 14 overlie or overlap the end portions 11a (see Fig. 5) of the flanges 11—11 at the top and bottom ends of the thus far formed container body. The next step to complete the assembly of the body so that it is locked in complete body formation, is to lift up said end portions 11a of the flanges 11 as shown in Fig. 7 so that the end portions 11b of said flanges, more directly associated with the flap 13, may be tucked under said end portions 11a. Thus at both ends of the body the flange end portions 11a overlap the flange end portions 11b as well as end portions of the seam and prevent accidental or unintended separation or opening of the container body at the separable seam. It is apparent that the flange end portions 11a have a dual function in preventing longitudinal shifting between the parts of the body at the seam and in holding the flaps.

When the body is assembled as before described, the depressions 17 are located adjacent the rounded longitudinal edge of the separable seam as formed by the fold line 15 as best appears in Fig. 1.

The body as thus formed with the top and bottom flanges and the several thicknesses of stock at the seam, has a considerable strength when the material of which it is formed is considered. Thus the body ably resists internal and external pressures tending to distort and collapse. Furthermore, the seam reinforces the body longitudinally so that it resists a considerable compressive or endwise pressure.

Each end of the body is adapted to receive a suitable closure cap 18. One form of such cap which appears in Figs. 1 and 10, includes an end wall or head 19 and inner and outer annular flanges 20—21. These flanges which are connected at one end by a rounded juncture 22, coact to provide an annular groove which frictionally and snugly receives the associated flanged end of the body. The cap flange 21 is of a depth approximating that of the associated body flange 11 and the wall or head 20 is offset inwardly from the rounded junction 22. Preferably each cap is die-formed from a paper disc of appropriate diameter, and, therefore, the excess stock of the disc which must be displaced in the formation of the flange 21, is taken up in said flange by the formation of axially disposed grooves and ridges thereon. Thus this flange has considerable stiffness and while it may expand circumferentially slightly in its application to a body end, it tends to fit with a tight frictional grip on said body end. Such a cap thus braces the body both externally and internally and further increases the rigidity of the container as a whole so that a further aid is presented in resisting collapsing stresses.

In Fig. 12 is shown a modified form of cap which may be used if desired. In such a cap, the outer flange 21a is made of a greater axial depth and the same includes an internal extension 21b, which is so formed as to engage the free edge of the associated body flange 11. The engagement of the parts mentioned provides a hook-like edge-to-edge connection between the cap and body.

The container described is particularly intended for use in the factory packing of frozen confections such as creams, ices, sherbets and like products. Thus in describing a use for which the improved container is especially adapted, the packaging of ice cream will be specifically mentioned but it is not intended that such mention be by way of limitation.

The ice cream manufacturers receive the containers in a knock-down or disassembled condition, the body blanks as shown in Fig. 3 being arranged in stacks. A body blank while in the condition shown in Fig. 3 is rolled into a body as before described and a cap 18 is applied to one end thereof and this closed end is placed bottom down, upon a suitable supporting surface and its open end is disposed at the top. A partly frozen ice cream mix, in a rather semi-solid state is discharged into the open top end of the container, until the desired level has been reached and which is determined by the position the head of the top closure cap occupies with respect to the contents. The mix described is of such a consistency that the structure of the separable seam, inhibits its leaking therethrough.

It is, of course, understood, that the usual means for filling containers employed in ice cream factories for factory packing is used for filling the containers herein and that a plurality of such containers are disposed in a tray and are filled at one and the same time. In this respect, it is pointed out that the mix while being fluid enough to be mobile or move under its own weight, cannot leak through the separable seam due to the zigzag course it must pursue for that purpose. Also, the weight of the contents will tend to press outwardly on the parts of the same so as to cause the parts thereof to come into closer and tighter engagement. When so filled, a cap 18 is placed upon the open top end of the container to close the same. In applying the top end closures, this rounds out the top end of the container so that an even, uniform, cylindrical container package results. The trays of filled containers then go to the freezing room and are frozen into a relatively hard condition and it is in this condition that they are distributed to the trade. A closure cap 18 is applied to the top end of the body of such container either before or after freezing as mentioned. It is pointed out that as the paper is relatively thin as compared to the stock now used for containers under the conventional practices, a more rapid freezing occurs. This not only reduces the cost in proportion but also results in a smoother ice cream which is free from ice crystals. As the final freezing occurs in faster time, less shrinkage occurs and, therefore, the contents always measures up to standard as to bulk.

When the packages reach the distributing retailer, they are usually stored in refrigerated compartments. In such compartments they may be stacked end to end, or in horizontal rows. In either instance, the packages withstand the strains and weights of those above without distortion and leakage and without breaking or giving away at the seam. Thus the packages remain in a sanitary condition due to the cleanliness possible to maintain in the refrigerated storage compartment.

When a purchaser desires to serve the ice cream from a container, the end closures are first removed and the remainder of the package is preferably disposed on its side upon any suitable supporting surface, with the seam facing upwardly. That part of the container as defined by its flap 14 and associated wall part is then digitally grasped by the thumb and finger of one hand and is turned back upon the body of the container for an initial stripping or release from the content. In this initial part of said stripping, the end portions 11b—11b, of the flanges 11, pull out from under the end portions 11a—11a thereof and the flap 14 becomes exposed so as to be digitally grasped between the thumb and finger of the other hand. It is pointed out that since the flaps are at no time engaged by the contents, they are dry and clean when exposed, so that the fingers do not become soiled in this operation. When the flaps 13 and 14 are thus digitally grasped, they are swung downwardly in opposite directions toward the surface upon which the package is placed, to strip the body from the contents. The body of the container is then disposed in a flat condition as best shown in Fig. 11. It is pointed out that as the effective length of the content body is determined by the distance between the heads of the closure caps, this length will be less than that of the body, after the removal of the caps. Thus the ends of the content body or mass is spaced from the end edges of the body as defined by the score lines 12—12, by relatively dry margins and which were previously engaged in the grooves of the caps.

When the container is made from wax-impregnated paper, there is substantially no adherence between content and container and it is not, therefore, necessary to run water on the package for any thawing to make a ready release between the content and the body in the stripping of the body from said content. When the body is stripped from the content, the latter is exposed at a point about midway between the end flaps and is spaced between the end edges of the body and has a substantially smooth, external surface. Due to the provision of the depressions 17 in the body blank, small indentations 17a are visible on the contents. These indentations visibly indicate where the contents should be sliced to provide equal portions for serving. After the content has thus been served, the container body and caps are discarded.

By means of the present invention, several points of economy are present for the ice cream manufacturer alone. In this respect, it is pointed out that the initial cost of the containers is considerably lower than that of the containers in which ice cream is now packed at the factory. In another respect, larger numbers of the containers of the present invention may be stored by the ice cream manufacturer in less space so that the saved space is available for other purposes. Again, the filled containers may be more quickly frozen and this not only results in a saving in this respect, but results in a further saving by reducing shrinkage of the content in each container to a minimum.

By means of the present invention, certain advantages are inherent for the purchaser in that the package is easily opened without the necessity of thawing the package and without soiling the fingers. Also, there is no waste of the content which may be quickly divided into equal portions for serving and this without any messing of the surface upon which the package is placed and opened.

While in describing the invention, we have referred in detail to the form and arrangement of the container parts, and to certain steps in the method of filling the container with a content as well as the method of serving the latter, the same is to be considered only in the illustrative sense so that we do not wish to be limited thereto except as may be specifically set forth in the appended claims.

We claim as our invention:—

1. As an article of manufacture, a blank for a container body comprising a rectangular sheet of relatively thin paper having longitudinal score lines defining top and bottom flanges adapted in forming the container to be folded on the outside of the same and having transverse score lines defining end flaps terminating at their ends substantially at the first mentioned score lines and adapted in forming the container to interlock with each other, the flanges at the top and bottom adapted on completion of the container to interlock with the end flaps at the upper and lower ends of the latter.

2. As an article of manufacture, a blank for a container body comprising a rectangular sheet of relatively thin paper having longitudinal score lines defining top and bottom flanges adapted in forming the container to be folded on the outside of the space and having transverse score lines defining end flaps terminating at their ends substantially at the first mentioned score lines and adapted in forming the container to interlock with each other, the flanges at the top and bottom adapted on completion of the container to interlock with the end flaps at the upper and lower ends of the latter, there being division indicia means formed on said blank and spaced transversely thereof.

3. In a container, a body made from a blank of sheet material formed into tubular shape and having end portions interlocked together to provide a separable seam extending from end to end of the body, and means providing top and bottom flanges for the body, a part only of each flange detachably overlapping and interlocking with an associated end of the seam and the end portion of one flange overlapping the other end portion of said one flange.

4. In a container, a body made from a blank of sheet material formed into tubular shape and having end portions interlocked together to provide a separable seam extending from end to end of the body, means for enclosing the ends of the seam on one surface of the body comprising top and bottom flanges with only an end part of each flange detachably overlapping and interlocking with an associated end of the seam, and means providing division indicia spaced in the direction of the length of the body.

5. In a container, a tubular body made from a blank of sheet material and having a separable seam extending from one end to the other of the body and formed by interlocked portions of the body, and top and bottom flanges extending more than once around the body, a part of each flange overlapping a part of each end of the seam on the outside of the body.

6. In a container, a body made from a paper blank formed into tubular shape with the end portions arranged in overlapping relation to form a separable seam extending from end to end of the body and means providing top and bottom flanges with only an end part of each flange detachably overlapping and interlocking with an associated end of the seam and also overlapping each other.

7. In a container, a tubular body made from a blank of sheet material and having a separable seam extending from one end to the other of the body and formed by interlocked portions of the body and top and bottom flanges extending more than once around the body, a part of each flange overlapping a part of each end of the seam and on the outside of the body.

8. As an article of manufacture, a blank for a container body comprising a rectangular sheet of relatively thin paper, top and bottom marginal parts thereof being folded over upon the same side of the blank to form top and bottom flanges, there being a flap at each end of the blank connected thereto by a score line for a folding over of said flaps towards opposite sides of the blank and adapted to form an interlocking seam when the blank is formed into a container body, said top and bottom marginal portions terminating at said score lines whereby only an end part of each marginal portion may be detachably interlocked with said interlocking seam.

9. The method of forming a container body for use in connection with frozen edible products which consists in providing a rectangular paper blank and folding top and bottom portions thereof upon the same side of the blank and folding end portions of the blank upon opposite sides of the blank, shaping the blank into a tubular form and interlocking the folded over end portions to form a separable seam for the body, engaging one end of said top and bottom portions of the blank under the other end of said top and bottom portions of the blank, and then tucking the end portions of the seam under the engaged ends of said top and bottom portions.

10. The method of forming a container body for use in connection with frozen edible products which consists in providing a rectangular paper blank having opposite end portions formed for interlocking engagement, shaping the blank into tubular form, interlocking said end portions to provide a separable seam for the body extending from end to end thereof, and then tucking end portions of said seam under portions of the end of the body to hold the ends of the seam closed.

FREDERICK T. KREIN.
TORRIS H. ALFREDS.